US011242001B2

(12) United States Patent
Ueberschaer et al.

(10) Patent No.: US 11,242,001 B2
(45) Date of Patent: Feb. 8, 2022

(54) METHOD OF OPERATING AN AIRCRAFT CABIN ILLUMINATION SYSTEM, AIRCRAFT CABIN ILLUMINATION SYSTEM, AND AIRCRAFT COMPRISING THE SAME

(71) Applicant: Goodrich Lighting Systems GmbH, Lippstadt (DE)

(72) Inventors: Andreas Ueberschaer, Gütersloh (DE); Andre Hessling-Von Heimendahl, Koblenz (DE); Christian Schoen, Mainz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/711,908

(22) Filed: Dec. 12, 2019

(65) Prior Publication Data
US 2020/0298753 A1    Sep. 24, 2020

(30) Foreign Application Priority Data

Mar. 22, 2019   (EP) ..................................... 19164627

(51) Int. Cl.
*B60Q 3/66* (2017.01)
*B60Q 3/43* (2017.01)
*B64D 11/00* (2006.01)

(52) U.S. Cl.
CPC ............. *B60Q 3/66* (2017.02); *B60Q 3/43* (2017.02); *B64D 11/00* (2013.01); *B64D 2011/0038* (2013.01)

(58) Field of Classification Search
CPC ... B60Q 3/66; B60Q 3/40; B60Q 3/43; B60Q 3/47; B60Q 3/74; B60Q 3/745; B64D 11/00; B64D 47/02; B64D 2011/0038; B64D 2203/00
See application file for complete search history.

(56) References Cited

U.S. PATENT DOCUMENTS

| | | | | |
|---|---|---|---|---|
| 5,677,603 A | * | 10/1997 | Speirs | H05B 47/155 315/324 |
| 7,731,399 B2 | * | 6/2010 | Kessler | B60Q 3/78 362/471 |
| 9,617,014 B2 | * | 4/2017 | Abel | B64D 47/02 |
| 2007/0291483 A1 | * | 12/2007 | Lys | G09G 3/14 362/227 |

(Continued)

FOREIGN PATENT DOCUMENTS

JP      2000350195 A    12/2000

OTHER PUBLICATIONS

European Search Report for Application No. 19164627.2, dated Sep. 27, 2019, 9 pages.

*Primary Examiner* — Thai Pham
(74) *Attorney, Agent, or Firm* — Cantor Colburn LLP

(57) ABSTRACT

A method of operating an aircraft cabin illumination system, having a plurality of light modules with a set spatial distribution across an aircraft cabin, includes receiving an image; mapping the image to the set spatial distribution of the plurality of light modules; generating an illumination command set, including an operating command for each of the plurality of light modules, on the basis of the mapping of the image to the set spatial distribution of the plurality of light modules; and issuing the illumination command set to the plurality of light modules.

12 Claims, 5 Drawing Sheets

(56) References Cited

U.S. PATENT DOCUMENTS

| | | | |
|---|---|---|---|
| 2011/0163697 A1* | 7/2011 | Mizukami | B60Q 3/43 |
| | | | 315/324 |
| 2011/0305031 A1* | 12/2011 | Riedel | B60Q 3/43 |
| | | | 362/471 |
| 2012/0013252 A1* | 1/2012 | Eckel | H05B 47/18 |
| | | | 315/77 |
| 2013/0218409 A1* | 8/2013 | Blain | B64D 11/0015 |
| | | | 701/36 |
| 2015/0170604 A1* | 6/2015 | Iwagaki | G09G 5/02 |
| | | | 345/589 |
| 2017/0057638 A1 | 3/2017 | Chen et al. | |
| 2018/0327096 A1* | 11/2018 | Lins | B64D 11/00 |

\* cited by examiner

METHOD OF OPERATING AN AIRCRAFT CABIN ILLUMINATION SYSTEM, AIRCRAFT CABIN ILLUMINATION SYSTEM, AND AIRCRAFT COMPRISING THE SAME

FOREIGN PRIORITY

This application claims priority to European Patent Application No. 19164627.2 filed Mar. 22, 2019, the entire contents of which is incorporated herein by reference.

TECHNICAL FIELD

The present invention is in the field of interior aircraft lighting. In particular, the present invention is in the field of illumination systems of aircraft cabins.

BACKGROUND

Almost all modern aircraft, in particular commercial passenger aircraft, have interior lighting. The interior lighting of an aircraft serves a variety of different purposes. Cabin illumination lights are provided for a general illumination of the aircraft cabin, allowing the passengers and crew to be aware of their surroundings and to walk around the cabin. Signalling lights, such as exit sign lights, are provided for conveying information to the passengers and crew, such as safety-critical information about the positions of the emergency exits of the aircraft. Further, targeted lighting is provided for a variety of purposes. For example, reading lights allow passengers to individually adapt the illumination of their personal space.

Despite this extensive use of different kinds of interior aircraft lights, it would be beneficial to add further functionality to interior lighting systems of aircraft.

SUMMARY

Exemplary embodiments of the invention include a method of operating an aircraft cabin illumination system having a plurality of light modules with a set spatial distribution across an aircraft cabin, the method comprising: receiving an image; mapping the image to the set spatial distribution of the plurality of light modules; generating an illumination command set, including an operating command for each of the plurality of light modules, on the basis of the mapping of the image to the set spatial distribution of the plurality of light modules; and issuing the illumination command set to the plurality of light modules.

Exemplary embodiments of the invention allow for a wholistic, flexible and efficient control of the illumination of the aircraft cabin via the aircraft cabin illumination system. In particular, various desired illumination patterns may be achieved without the need to set the control of the individual light modules in an individualized manner. Rather, an illumination pattern resembling a particular image may be achieved via a mapping of the pixels of the image to the spatial distribution of the light modules available in the aircraft cabin illumination system. The control of the individual light modules is a result of the mapping and, as such, dependent on and set by the image. Different illumination patterns may be realized via the comparably little complex provision of different images. Illumination patterns conveying or enhancing particular signalling information or particular flight stage information may be flexibly and efficiently provided. For example, spot-like illumination patterns may be provided for enhancing the passenger's awareness for emergency exit locations or the like. In another example, arrow-shaped illumination patterns or color transition illumination patterns may be provided for indicating a walking direction during boarding and/or deboarding. In yet another example, illumination patterns conveying a particular mood, such as a cozy night time mood, may be provided. In this way, the passenger safety and/or the passenger information and/or the passenger convenience in the confined space of an aircraft cabin may be improved. This may be achieved via the provision of according images, without the need to assemble sets of respectively independent individual control commands to the light modules.

The method comprises the step of receiving an image. The image may be received from outside of the aircraft cabin illumination system or from a memory within the aircraft cabin illumination system or from any other suitable image source. In other words, the expression of receiving an image refers to obtaining an image from an image source, the image serving as the starting point for the ensuing method steps. Receiving the image may also be referred to as accessing the image or having access to the image. The image may be a digital image comprising a plurality of pixels. In particular, the term image may refer to two-dimensional image data in the form of a twodimensional array of pixels. The image may be provided in the form of an image file and may be encoded in any suitable manner.

The method comprises the step of mapping the image to the set spatial distribution of the plurality of light modules of the aircraft cabin illumination system. The term light module refers to an individually addressable portion the aircraft cabin illumination system. The aircraft cabin illumination system may comprise a plurality of light units, wherein each of the plurality of light units may have one or more individually addressable portions. For example, the plurality of light units may comprise one or more extended light units that run along the aircraft cabin, such as extended side wall illumination light units. Such light units may have various sections along the aircraft cabin that may be individually operated. In this example, each individually operable section of the extended light unit forms a light module of the aircraft cabin illumination system. Other light units, such as targeted spot light units e.g. for galleys or wash room areas, may be controllable in their entirety and, thus, may consist of a single light module.

As stated above, the aircraft cabin illumination system has a plurality of light modules with a set spatial distribution across the aircraft cabin. In other words, the plurality of light modules have a set spatial arrangement within the aircraft cabin. The terminology of the plurality of light modules being distributed across the aircraft cabin does not mean that every part of the aircraft cabin is provided with light modules or that every part of the surface of the aircraft cabin may be illuminated by the plurality of light modules. Rather, the feature of the plurality of light modules being distributed across the aircraft cabin means that there are light modules along a substantial part of the extension of the aircraft cabin. The plurality of light modules with the set spatial distribution may be seen as a sparse matrix of light modules across the aircraft cabin surface. The population of the sparse matrix may be based on the locations of the plurality of light modules and/or on the direction/directivity of the light modules. The plurality of light modules may be seen as pixels or pixel groups on a projected representation of the aircraft cabin surface.

The method comprises the step of mapping the image to the set spatial distribution of the plurality of light modules. In particular, the step of mapping the image to the set spatial distribution of the plurality of light modules may comprise mapping the image to a two-dimensional projection of the locations of the plurality of light modules in the aircraft cabin. The mapping may include a scaling of the image to correspond to the portion of the aircraft cabin in question or vice versa. The mapping may also include a selection of those pixels of the image that correspond to the locations of the light modules within the aircraft cabin. In this way, a selection of pixels of the densely populated matrix of the image may be mapped to the sparsely populated matrix of the light module distribution across the aircraft cabin. It is also possible that a filtering of the image takes place. For example, it is possible to apply a low-pass filter, in order to avoid sharp color and/or brightness transitions across neighboring light modules. It is also possible that a filtering of the image takes place that takes into account the characteristics of the plurality of light modules. For example, for light modules having a comparably large light output area, localized low-pass filtering of particular image portions may take place, while the sharpness of transitions may be maintained for light modules having a comparably smaller light output area and/or for regions of the aircraft cabin having a higher density of light modules. In another example, a color filter may be applied to the image. In a particular example, a color filter may be applied to a grey scale image. The color filter may be adjustable to adjust the color of the image to be mapped to the set spatial distribution of the plurality of light modules.

The method comprises the step of generating an illumination command set on the basis of the mapping of the image to the set spatial distribution of the plurality of light units. The term illumination command set refers to the totality of the desired operations of the plurality of light modules, in order to generate an illumination representing the mapped image via the operation of the plurality of light modules. The illumination command set includes a plurality of operating commands, namely an operating command per light module. In other words, the illumination command set specifies a desired operation for each of the plurality of light modules. An operating command may be encoded in any suitable manner. It may be a simple on-off command or a command specifying a particular light output color and/or light output intensity. The operating command may be a representation of the desired light output or may be a representation of the electric control values applied to the light source (s) of the light module, in order to achieve the desired light output. The operating command may be encoded according to a predefined operating command protocol. The predefined operating command protocol may for example have an address portion and a data portion. The particular light output color and/or light output intensity may be contained in the data portion.

The method comprises the step of issuing the illumination command set to the plurality of light modules. The entity generating the illumination command set may be directly coupled to the plurality of light modules. However, it is also possible that the entity generating the illumination command set is coupled to the plurality of light modules via other entities, for example in a layered structure. The issuing of the illumination command set to the plurality of light modules may also be refered to as providing the illumination command set towards the plurality of light modules or as outputting the illumination command set from the entity generating the illumination command set. It is possible that all operating commands are provided to all light modules, with the individual light modules selectively responding to the particular operating command targeted to them. It is also possible that each operating command is provided to the associated light module in a targeted manner. It is further possible that an intermediate communication model is used, with groups of operating commands being provided to groups of light modules, as will be explained in more detail below. The plurality of light modules are configured to respond to the operating commands by providing the requested illumination. Accordingly, the issuing of the illumination command set to the plurality of light modules may also be seen as causing the plurality of light modules to provide a light output corresponding to the respective operating command.

According to a further embodiment, the operating command is indicative of at least one of a light color and a light intensity for at least a subset of the plurality of light modules. In this way, the operating command may set the desired color and/or the desired intensity of the light output of the light module in question for those light modules that are dimmable and/or have the capacity of adapting the light output color. For adapting the light color, the light modules may have light sources of different colors, with the indicated light color being achieved by operating a selected one of the light sources or by mixing the light output of multiple light sources. In this way, at least the said subset of the plurality of light modules may be operated with more degrees of freedom than a simple on/off operation, and the resemblance between the illumination across the aircraft cabin and the image may be achieved to a higher degree than with simple on/off operations. The light output color and the light output intensity may also be refered to as chromaticity and brightness of the light output of the individual light modules.

According to a further embodiment, the step of receiving the image comprises receiving the image from outside of the aircraft cabin illumination system. In this way, the aircraft lighting system is open to image input from outside of the aircraft cabin illumination system. The illumination in accordance with the mapped image may be flexible to accommodate for any kind of new desired illumination pattern. In particular, the step of receiving the image may comprise receiving the image from a flight attendant panel coupled to the aircraft cabin illumination system. In this way, full control of the aircraft cabin illumination system remains with the flight crew, and the illumination pattern, resulting from the mapped image, may be controlled by a flight attendant panel.

According to a further embodiment, the step of receiving the image comprises receiving the image from a memory within the aircraft cabin illumination system. In this way, the image may be a pre-stored and/or pre-approved image, with the resulting illumination pattern also being pre-defined and/or pre-approved within the aircraft cabin illumination system. Also, accessing the image from a memory within the aircraft cabin illumination system may eliminate the need for an interface into the air-craft cabin illumination system that is capable of transmitting the comparably high data volume of an image into the system. In particular, the step of receiving the image may comprise receiving the image from a memory within the aircraft cabin illumination system in response to a receiving an image selection command from outside of the aircraft cabin illumination system and accessing the memory in accordance with the image selection command. The image selection command may, for example, be received from a flight attendant panel coupled to the aircraft cabin illumination system. In this way, control over the illumination of the aircraft cabin may remain outside of the aircraft cabin illumination system, but with the flight crew.

According to a further embodiment, the method comprises receiving a sequence of images; mapping each of the sequence of images to the set spatial distribution of the plurality of light modules; generating a sequence of illumination command sets, each of the plurality of illumination command sets including an operating command for each of the plurality of light modules, on the basis of the mapping of each of the sequence of images to the set spatial distribution of the plurality of light modules; and issuing the sequence of illumination command sets to the plurality of light modules. In this way, a time-variant illumination of the aircraft cabin, resembling a sequence of images, may be achieved. For example, a moving arrow pattern may be provided for assisting the passengers in finding their way to emergency exit locations and/or in animating the passengers during boarding/de-boarding.

The sequence of images may be a video signal. In other words, the method may comprise the mapping of a video to the set spatial distribution of the plurality of light modules, and a sequence of illumination patterns resembling said video may be provided. The method may be configured to issue the individual illumination command sets, corresponding to individual images of the video, in quick succession. In particular, the method may issue more than 10 illumination command sets per second, in particular between 30 and 100 illumination command sets per second. In this way, illumination patterns resembling a video with between 30 and 100 frames per second may be provided.

The generating of the sequence of illumination command sets and the issuing of the sequence of illumination command sets to the plurality of light units may be carried out in a data processing pipeline. After individual ones of the sequence of illumination command sets are generated, those illumination command sets may be issued to the plurality of light modules, while ensuing illumination command sets are generated.

According to a further embodiment, the method further comprises displaying the image on a screen in the aircraft cabin, in particular on a common screen arranged at a front portion of the aircraft cabin. In this way, the illumination of the aircraft cabin and the display of the image on the screen may complement each other. In particular, the illumination of the aircraft cabin may enhance the passengers' perception of the image on the screen. For example, in case of important passenger information being displayed on the screen, passenger awareness of this information may be increased. In other examples, a wholistic feel of the aircraft cabin may be achieved by the combined provision of the image on the screen and the provision of the mapped version of the image via the aircraft cabin illumination system. The displaying of the image on the screen and the issuing of the illumination command set to the plurality of light modules may be synchronized. In particular, the displaying of the image on the screen and the provision of the light output by the plurality of light modules in accordance with the illumination command set may be synchronized. The synchronization may be particularly beneficial for above described mapping of a sequence of images to the set spatial distribution of the plurality of light modules and the generating of a sequence of illumination command sets. In this case, the sequence of images, e.g. in the form of a video, may be displayed on the screen, and the video on the screen and the sequence of illumination patterns via the aircraft cabin illumination system may complement each other. The image may be provided to the screen by the aircraft cabin illumination system. It is also possible that the image or the sequence of images is provided both to the aircraft cabin illumination system and the screen from an image/video source outside of the aircraft cabin illumination system.

According to a further embodiment, the plurality of light modules are distributed among at least one of the group comprising: at least one ceiling light unit, at least one overhead compartment light unit, at least one handrail light unit, at least one seating light unit, at least one wall light unit, at least one window light unit, and at least one monument light unit. In other words, one or a subset or all of the ceiling light unit(s), the overhead compartment light unit(s), the handrail light unit(s), the seating light unit(s), the wall light unit(s), the window light unit(s), and the monument light unit(s) may have light modules used in the method of operating an aircraft cabin illumination system described herein. A part or all of the aircraft cabin illumination system of a particular aircraft may be involved in the method of operating an aircraft cabin illumination system, described herein.

Exemplary embodiments of the invention further include a method of generating an illumination command set for a plurality of light modules of an aircraft cabin illumination system, the plurality of light modules having a set spatial distribution across an aircraft cabin, the method comprising: mapping an image to the set spatial distribution of the plurality of light modules; and generating the illumination command set, including an operating command for each of the plurality of light modules, on the basis of the mapping of the image to the set spatial distribution of the plurality of light modules. The additional features, modifications, and effects, described above with respect to the method of operating an aircraft cabin illumination system, apply to the method of generating an illumination command set in an analogous manner. The method of generating the illumination command set may be carried out outside of the aircraft. For example, the illumination command set may be generated, before the aircraft cabin illumination system is installed in the aircraft. The illumination command set may be stored in the aircraft cabin illumination system before operation thereof. Accordingly, instead of mapping the image on-the-fly during operation of the aircraft cabin illumination system, as described above, it is possible to map images or videos to the set spatial distribution of the plurality of light modules outside of the aircraft cabin illumination system and/or in advance of the operation of the aircraft cabin illumination system and to provide the illumination command set(s) to the aircraft cabin illumination system. The method of generating the illumination command set may include the step of storing the illumination command set in the aircraft cabin illumination system, in particular storing the illumination command set in a memory of the aircraft cabin illumination system. The controller of the aircraft cabin illumination system may access the illumination command set in operation and control the plurality of light modules in accordance therewith.

Exemplary embodiments of the invention further include an aircraft cabin illumination system, comprising: a plurality of light modules having a set spatial distribution across an aircraft cabin; and a controller for controlling the plurality of light modules, wherein the controller is configured to: receive an image; map the image to the set spatial distribution of the plurality of light modules; generate an illumination command set, including an operating command for each of the plurality of light modules, on the basis of the mapping of the image to the set spatial distribution of the plurality of light modules; and issue the illumination command set to the plurality of light modules. The additional features, modifications, and effects, described above with respect to the method of operating an aircraft cabin illumination system, apply to the aircraft cabin illumination system in an analogous manner. In particular, the controller may receive the image from outside of the aircraft cabin illumination system or from within the aircraft cabin illumination system. The receiving of the image from within the aircraft cabin illumination system may comprise receiving the image from a memory within the aircraft cabin illumination system, but outside of the controller or receiving the image from a memory within the controller/associated with the controller.

According to a further embodiment, each of the plurality of light modules has one or more light sources. In particular, each of the plurality of light modules may have one or more LEDs. With LEDs being comparably small light sources, a high spatial resolution within the light modules and, thus, within the aircraft cabin may be achieved. The LEDs may be of different colors, as will be discussed in more detail below.

According to a further embodiment, at least a first subset of the plurality of light modules are multi-color light modules, and the controller is configured to generate operating commands for at least the first subset of the plurality of light modules that include light color indications. In this way, for at least the first subset of the plurality of light modules, color images may result in an accordingly colored illumination of the aircraft cabin. The first subset of the plurality of light modules may be any subset of the plurality of light modules. In particular, the first subset may include a single one or selected ones or all of the plurality of light modules.

According to a further embodiment, at least a second subset of the plurality of light modules are dimmable light modules, and the controller is configured to generate operating commands for at least the second subset of the plurality of light modules that include light intensity indications. In this way, the aircraft cabin illumination system may be well-adapted to illuminate the aircraft cabin in a way that resembles an image containing different levels of light intensity/brightness. The second subset of the plurality of light modules may be any subset of the plurality of light modules. In particular, it may comprise a single one or several or all of the plurality of light modules. Further in particular, the second subset of the plurality of light modules may be identical, overlapping, or disjunct with respect to above discussed first subset of the plurality of light modules.

According to a further embodiment, the aircraft cabin illumination system comprises a plurality of light units, wherein each of the plurality of light units includes one or more of the plurality of light modules. While the term light module refers to a logical illumination unit that is individually addressable/controllable, the term light unit refers to an entity that provides the infrastructure for operating the light sources therein. For example, a light unit may have power supply connections, a control interface, and light source driver circuitry. In this way, the light unit is the entity that has the outside connections and control circuitry for selectively operating the light sources in accordance with the operating commands. As stated above, a light unit may have a single light module or may have a plurality of light modules. In this way, a layered architecture may be provided, and an efficient separation between interfaces and driver circuitry on the one hand and logical illumination points on the other hand may be provided.

According to a further embodiment, each of the plurality of light units includes one light module or a linear arrangement of multiple light modules or a two-dimensional array of multiple light modules. In this way, the light units provide illumination in well-defined geometric shapes, namely as a point illumination source, as a line illumination source or as a tile illumination source. Such well-defined geometric shapes may form efficient mapping targets, when mapping the image to the spatial distribution of the light modules across the aircraft cabin.

According to a further embodiment, the controller is a global controller, the aircraft cabin illumination system comprises a plurality of local area controllers coupled to the global controller, and the plurality of light units are coupled to the local area controllers. In this way, a further layer in the form of local area controllers is provided in the aircraft cabin illumination system. In this way, a particularly favorable tradeoff between system complexity and communication traffic due to the transmission of the operating commands may be achieved.

According to a further embodiment, at least a subset of the plurality of light units are coupled to the local area controllers in daisy chain configurations. In this way, the wiring efforts and, thus, the weight penalty of the wiring of the aircraft cabin illumination system may be kept low.

According to a further embodiment, the plurality of light units are configured to receive operating commands in a predefined operating command protocol. Providing a universally valid operating command protocol throughout the aircraft cabin illumination system may allow for a particularly flexible and failure-proof implementation of the communication in the aircraft cabin illumination system. Additional light units may be included in the aircraft cabin illumination system, without changing the communication parameters thereof. Also, with the whole communication relying on the same predefined operating command protocol, the light units can filter out the operating commands targeted to them in a particularly reliable manner.

As stated above, the additional features, modifications, and effects, described herein with respect to the method of operating an aircraft cabin illumination system, apply to the aircraft cabin illumination system in an analogous manner. Conversely, the additional features, modifications, and effects, described herein with respect to the aircraft cabin illumination system, apply to the method of operating an aircraft cabin illumination system in an analogous manner.

Exemplary embodiments of the invention further include an aircraft, such as an air plane or a helicopter, comprising an aircraft cabin illumination system, as described in any of the embodiments above. The additional features, modifications, and effects, described above with respect to the aircraft illumination system, apply to the aircraft in an analogous manner.

BRIEF DESCRIPTION OF THE FIGURES

Further exemplary embodiments of the invention will be described below with respect to the accompanying drawings, wherein.

DETAILED DESCRIPTION

Figure 1:
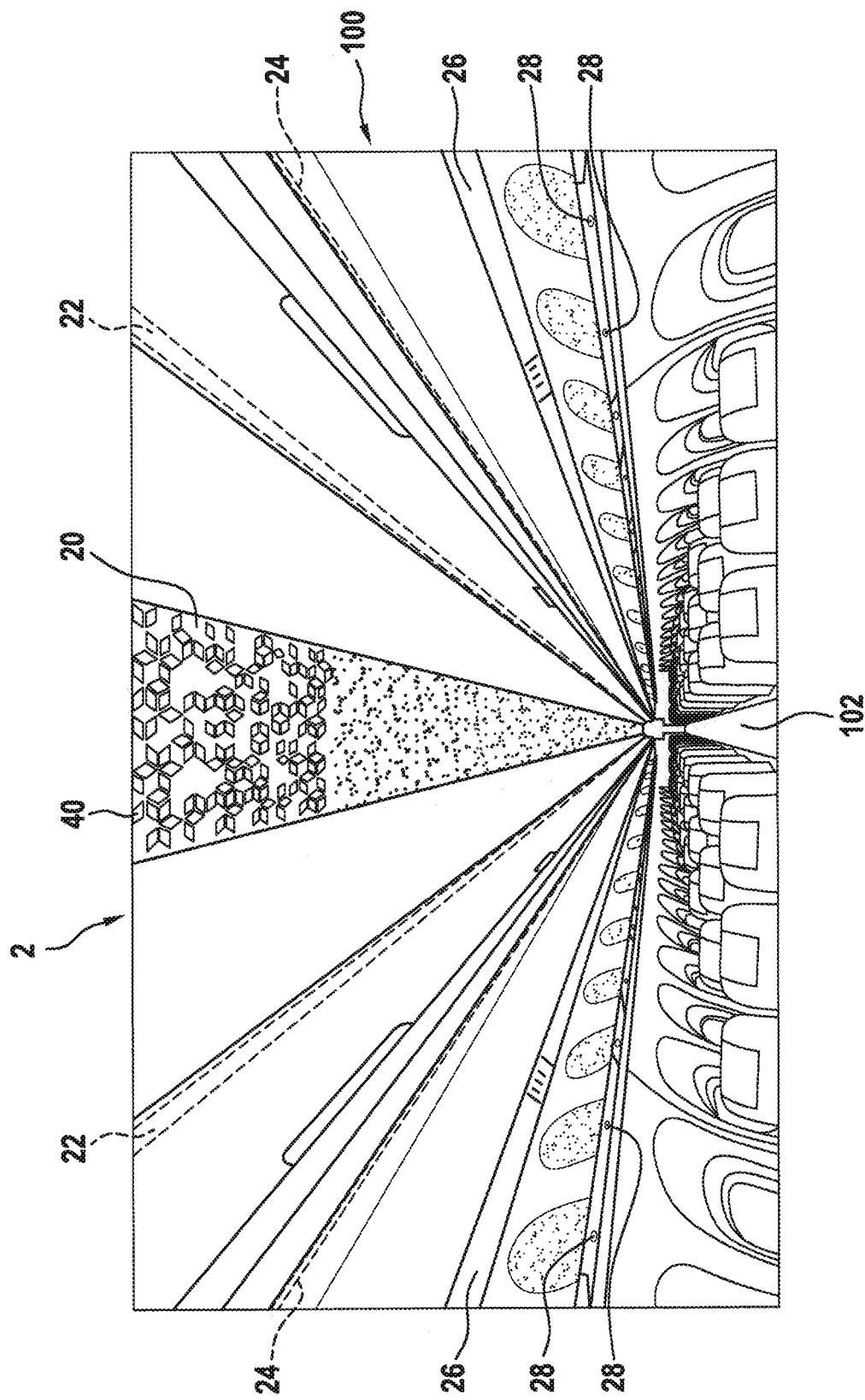
FIG. 1 shows a perspective view into the aircraft cabin of an aircraft in accordance with an exemplary embodiment of the invention, the aircraft being equiped with an aircraft cabin illumination system in accordance with an exemplary embodiment of the invention.

FIG. 1 shows an aircraft cabin 102 of an aircraft 100 in accordance with an exemplary embodiment of the invention in a perspective view. The perspective view of FIG. 1 is from a transverse coss-section through the aircraft cabin 102 looking backwards. The aircraft cabin 102 includes rows of seats, windows, overhead compartments, an aisle, and various other components, the details of which are not described herein as they are common to aircraft cabins of large passenger aircraft.

The aircraft 100 comprises an aircraft cabin illumination system 2, which is provided for illuminating the aircraft cabin 102. In the exemplary embodiment of FIG. 1, the aircraft cabin illumination system 2 comprises a ceiling light unit 20, two overhead compartment light units 22, arranged to the left and right of the ceiling light unit 20, two handrail light units 24, arranged to the left and right of the overhead compartment light units 22, two seating light units 26, arranged to the left and right of the overhead compartment light units 22, and a large number of wall light units 28, with two of said wall light units 28 being arranged to the left and right of each row of seats. The overhead compartment light units 22 are arranged between the ceiling and the overhead compartments and are blocked from view by the overhead compartments. Their light is emitted from behind the upper edges of the overhead compartments. They are therefore shown in phantom. The handrail light units 24 are integrated into the handrails that run along the aircraft cabin above the seats. They are also shown in phantom, indicating their integration into the handrails. The wall light units 28 are shown as circles in FIG. 1, with their light outputs illustrated as dotted patterns on the walls of the aircraft cabin 102.

In the exemplary embodiment of FIG. 1, the ceiling light unit 20, the overhead compartment light units 22, the handrail light units 24, and the seating light units 26 are elongated structures extending along the length of the aircraft cabin 102. It is also possible that, instead of one such light unit running along the length of the aircraft cabin 102, multiple light units are provided, with each of the multiple light units running along a section of the aircraft cabin 102. In other words, the light units shown as elongated structures in FIG. 1 may be single light units, respectively, or may each be comprised of multiple light units arranged one behind the other. In the exemplary embodiment of FIG. 1, the wall light units 28 are stand alone structures, spaced from each other. It is also possible that the wall illumination of the aircraft cabin 102 is provided via elongated wall light units, running along the side wall of the aircraft cabin 102. Both said spaced stand-alone wall light units as well as elongated wall light units may direct their light output upwards or downwards or upwards and downwards onto the side wall of the aircraft cabin 102.

Each of the ceiling light unit 20, the overhead compartment light units 22, the handrail light units 24, and the seating light units 26 comprises a plurality of light modules 40. Each of the light modules is an individually addressable entity that may light up independently from the other light modules in the respective light unit. In FIG. 1, this concept is best visualized with respect to the ceiling light unit 20. The ceiling light unit 20 has many light modules 40, with each of the light modules having a diamant-shaped light output surface. Each of the light modules is a multi-color light module, having light sources of different colors. For example, each light module may have a red LED, a green LED, and a blue LED, and a variety of different light colors may be output, depending on the control of the different colored LEDs. The ceiling light unit 20 thus provides a two-dimensional array of light modules, allowing for a customized two-dimensional light output.

The overhead compartment light units 22, the handrail light units 24, and the seating light units 26 each have linear arrangements of light modules. In this way, they are able to provide a light output customizable along one dimension. In the exemplary embodiment of FIG. 1, the seating light units 28 each have one light module, forming a customizable point light source.

It is pointed out that both the described light units of FIG. 1 as well as their arrangement in the aircraft cabin 102 are exemplary and that other light units and other arrangements may be present in the aircraft cabin illumination system. The arrangement and the number of light modules has an impact on the eventual illumination pattern, present in the aircraft cabin 102. However, the method of operating and controlling the plurality of light modules, as describes herein, is generally applicable to such different arrangements of light modules as well.

Figure 2:
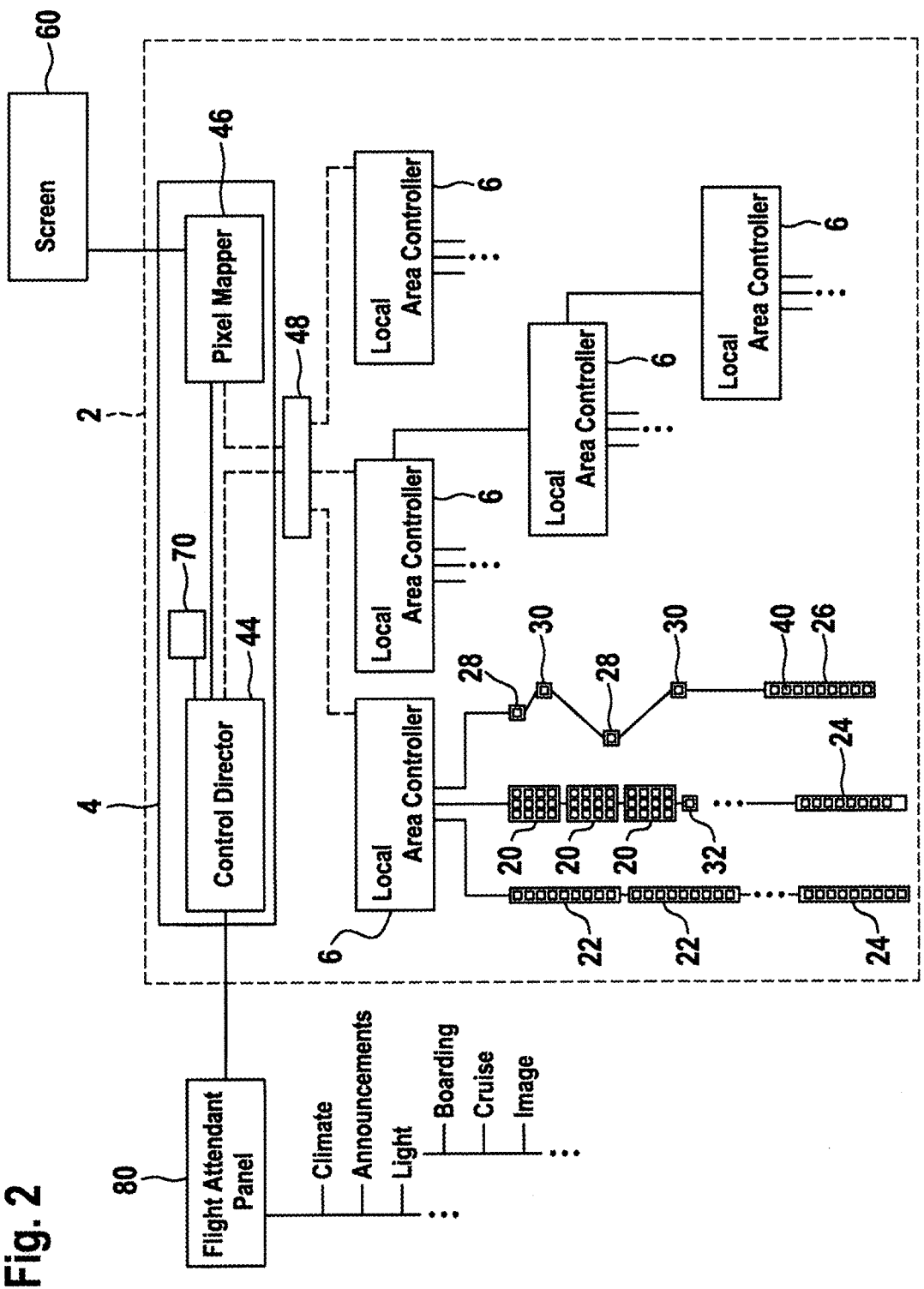
FIG. 2 shows a block diagram of an aircraft cabin illumination system in accordance with an exemplary embodiment of the invention.

FIG. 2 shows a block diagram of an aircraft cabin illumination system 2 in accordance an exemplary embodiment of the invention. The aircraft cabin illumination system 2 is shown in connection with a flight attendant panel 80 and a screen 60, which is a common screen arranged in a front portion of the aircraft cabin, such as a common screen attached to a backwall of a wash room portion of the aircraft cabin.

The aircraft cabin illumination system 2 comprises a controller 4, also referred to as global controller herein. The controller 4 is the entity within the aircraft cabin illumination system 2 that communicates with the outside of the aircraft cabin illumination system 2. In the exemplary embodiment of FIG. 2, the controller 4 has a communication interface with the flight attendant panel 80 and a communication interface with the screen 60. The controller 4 comprises a control director 44, a pixel mapper 46, and a memory 70. The memory 70 may also be provided outside of the controller 4, with the controller 4 being coupled to the memory 70. In the exemplary embodiment of FIG. 2, the control director 44 is coupled to the flight attendant panel 80, to the memory 70, and to the pixel mapper 46. The pixel mapper 46 is coupled to the screen 60. The control director 44 and the pixel mapper 46 are shown as separate entities in the exemplary embodiment of FIG. 2. However, it is also possible that an integrated entity performs the functions of the control director 44 and the pixel mapper 46.

The aircraft cabin illumination system 2 further comprises a plurality of local area controllers 6, coupled to the controller 4. In the exemplary embodiment of FIG. 2, the aircraft cabin illumination system 2 has n local area controllers 6. The number of local area controllers 6 may be adapted to the particular application scenario, taking into account factors such as the size of the aircraft, the number of light modules, the desire for a low amount of wiring, etc. In the exemplary embodiment of FIG. 2, two of the depicted local area controllers 6 are individually coupled to a switch 48, which is in turn coupled to the controller 4. Three of the depicted local area controllers 6 of FIG. 2 are coupled to each other in a chain-like or cascaded manner, with one of these three local area controllers being coupled to the switch 48. The local area controllers 6 may be coupled to the controller 4 in any suitable manner, depending on their number, the wiring constraints on the aircraft, etc.

Data communication takes place between the controller 4 and the local area controllers 6. This data communication is indicated by the dashed lines between the controller 4 and the local area controllers 6 in FIG. 2. The data communication may be unidirectional from the controller 4 to the local area controllers 6 or may be bidirectional. The switch 48 is coupled to the control director 44 and to the pixel mapper 46 of the controller 4 on the one hand and to local area controllers 6 on the other hand. The data communication from the controller 4 to the local area controllers 6 is routed by the switch 48. The data communication between the controller 4 and the local area controllers 6 may take place in any suitable manner. The switch may be dispensed with or replaced by another suitable component.

Each of the local area controllers 6 is coupled to a plurality of light units. For ease of illustrations, selected light units are shown for only one of the local area controllers 6. The local area controller 6 provides both power and operating commands to the light units coupled thereto. This provision of power and data is indicated by the solid lines in FIG. 2. For this purpose, the local area controllers 6 are coupled to the on-board power supply system of the aircraft.

In the exemplary embodiment of FIG. 2, a plurality of ceiling light units 20, a plurality of overhead compartment light units 22, a plurality of handrail light units 24, a plurality of seating light units 26, a plurality of wall light units 28, a plurality of window light units 30, and a monument light unit 32 are coupled to the local area controller 6 shown to the left in FIG. 2. The light units are coupled to the local area controller 6 in three daisy chain configurations. Each of the daisy chain configurations provides power and operating commands to a plurality of light units. In each of the daisy chain configurations, each light unit filters out the operating commands targeted towards that light unit, as will be explained in more detail below.

Each of the plurality of ceiling light units 20, the plurality of overhead compartment light units 22, the plurality of handrail light units 24, the plurality of seating light units 26, the plurality of wall light units 28, the plurality of window light units 30, and the monument light unit 32 comprises one or more light modules 40, indicated as small squares in the block diagram of FIG. 2. The plurality of window light units may be light units that provide illumination along a window frame, respectively. They may also be light units that provide illumination of a wall region around the window in another manner. The monument light unit may be a light unit that provides illumination of a special purpose structure in the aircraft cabin, such as illumination of a galley or a washroom area.

As stated before, the flight attendant panel 80 is coupled to the controller 4 of the aircraft cabin illumination system 2 via a communication interface. In the exemplary embodiment of FIG. 2, the flight attendant panel 80 lets the flight crew control various aspects of the aircraft cabin, such as the climate, the announcements, the light etc. The flight attendant panel 80 may comprise a touch screen, serving as the input device/human machine interface for the flight crew. As part of the light control, the illumination of the aircraft cabin may be controlled via the flight attendant panel 80. In the exemplary embodiment of FIG. 2, the setting of the illumination may be done via scenario selection commands, such as "Boarding" or "Cruise", or via the selection of an image, as will be described below.

The operation of the aircraft cabin illumination system 2, as controlled by the flight attendant panel 80, is described as follows.

The operation is described for the scenario selection command "Boarding" being selected via the flight attendant panel 80. The flight attendant panel 80 transmits said scenario selection command "Boarding" to the controller 4 of the aircraft cabin illumination system 2, in particular to the control director 44 of the controller 4. The control director 44 interprets said scenario selection command as an image selection command and accesses the indicated image in the memory 70. In the exemplary embodiment of FIG. 2, the controller 4, in particular the control director 44 of the controller, receives an image from the memory 70 that shows green arrows pointing downwards in the image. In the aircraft cabin frame of reference, these downward pointing arrows are backwards pointing arrows, indicating the boarding direction for the passengers.

As a next step, the control director 44 provides the image to the pixel mapper 46. The pixel mapper 46 maps the image, received from the memory 70 and provided by the control director 44, to the set spatial distribution of the plurality of light modules 40 of the aircraft cabin illumination system 2. This mapping may be done in a variety of ways. An option is to map the image to a two-dimensional projection of the locations of the light modules across the aircraft cabin. In this case, the pixel mapper 46 may have a light module map, having the locations of the light modules indicated in a two-dimensional array. This light module map may also be referred to as a mapping image or a mapping function. For mapping the image from the memory 70 to the set spatial distribution of the light modules across the aircraft cabin, the pixel mapper 46 may make the image received from the memory 70 and the mapping image coincide. In this way, the locations of the light modules are mapped to particular portions, such as particular pixels, of the image from the memory 70. In the exemplary embodiment of FIG. 2, the color and the brightness of an associated pixel of the image from the memory 70 are assigned to each light module. The resulting set of color and brightness values per light module is referred to as illumination command set. The illumination command set contains a representation of the image from the memory 70, mapped to the set spatial distribution of the plurality of light modules. In particular, it represents a sparse version of the image, with the mapped pixels providing a resemblance to the image, but not a full representation thereof.

The illumination command set includes an operating command for each of the plurality of light modules in the form of a color indication, a light intensity indication, and a unique identifier of the addressed light module. The operating command may have a format specified in a communication protocol. In particular, the operating command may be in accordance with a predefined operating command protocol. The predefined operating command protocol may specify a frame structure, having the unique address identifier contained in a header field and having the color indication and the light intensity indication contained in a data field. The unique identifier may for example be the MAC address of the light module in question or any other unique logical address. The color indication may comprise color coordinates in any suitable color code. The light intensity indication may be a relative brightness value, indicating a desired percentage of the maximum illumination by the light module in question, or any other suitable indication.

As a next step, the pixel mapper 46 issues the illumination command set to the plurality of light modules. In other words, the pixel mapper 46 outputs the illumination commands set towards the plurality of light modules. In the exemplary embodiment of FIG. 2, the pixel mapper 46 transmits the illumination command set to the local area controllers 6 via the switch 48. The local area controllers 6 filter the illumination command set for those operating commands that address the light modules coupled to the local area controller in question. In particular, each local area controller 6 outputs those operating commands to the particular daisy chain configuration that includes the light module question. In this way, the local area controllers 6 receive the entire illumination command set and reduce the communication output for the connected daisy chain configurations to those operating commands that are relevant for the light modules in question. In each daisy chain configuration, the connected light units receive the operating commands from the local area controller 6 and control the addressed light modules in accordance therewith. This will be described in more detail below with respect to FIG. 3.

As a result, each of the light modules lights up in accordance with the operating command for that light module, as generated by the pixel mapper 46, and therefore lights up in accordance with the associated pixel of the image received from the memory 70. Across the aircraft cabin, an illumination resembling the image received from the memory 70 is achieved. The plurality of light modules, distributed across the aircraft cabin, are addressed in a wholistic manner and are jointly controlled to generate an illumination of the aircraft cabin that resembles the desired image.

The aircraft cabin illumination system may have a large number of light modules. With a large number of light modules, the resemblance between the image from the memory 70 and the illumination of the aircraft cabin may be achieved to a high degree. It is possible that the aircraft cabin illumination system has between 100,000 and 1,000,000 light modules. Smaller and larger numbers of light modules are possible as well. Each light module may have one or more light sources, in particular one or more LEDs. Various kinds of LEDs may be employed, such as white LEDs, warm white LEDs, RGB LED arrangements, infrared LEDs, UV LEDs, etc.

As stated above, the pixel mapper 46 is coupled to the screen 60, which is a common screen in the front of the aircraft cabin in the exemplary embodiment of FIG. 2. The pixel mapper may output the image, as received from the memory 70, to the screen 60 for being displayed thereon. In this way, the image may be displayed on the screen 60, while the illumination of the aircraft cabin resembles the same image. The display of the image on the screen 60 and the illumination of the aircraft cabin may complement each other in the passengers' perception.

In case the scenario selection command "Cruise" is selected by the flight attendant panel 80, this information is provided to the control director 44, and the control director 44 interprets this information as an according image selection command. The control director 44 accesses the memory 70 and receives an image associated with the image selection command "Cruise". The pixel mapper 46 then maps this image to the set spatial distribution of the plurality of light modules and carries out the control of the light modules, as described above with respect to the boarding scenario. The image associated with the image selection command "Cruise" may be a cloudy sky or any image suitable for generating a relaxed cruise flight atmosphere to the passengers.

In case an image is selected via the flight attendant panel 80, this image is provided to the controller 4 via the communication interface between the flight attendant panel 80 and the controller 4. The control director 44 passes the image on to the pixel mapper 46, and the pixel mapper 46 maps this image, as received from the flight attendant panel 80, to the set spatial distribution of the light modules across the aircraft cabin. The pixel mapper 46 further performs the control of the light modules in accordance with above described procedure. In this way, the generation of a customized illumination of the aircraft cabin is highly flexible. By introducing a new image into the aircraft cabin illumination system 2, an entirely new illumination pattern across the aircraft cabin may be achieved. Via the mapping of the image to the set spatial distribution of the light modules across the aircraft cabin, a cumbersome dealing with the individual operations of the light modules may be dispensed with. It is also possible that the aircraft cabin illumination system 2 has another data input, through which images may be loaded into the memory 70. It is further pointed out that the provision of an image via the flight attendant panel 80 is purely optional. It is also possible that the image are exclusively contained in the memory 70 and that the flight attendant panel 80 solely triggers a particular image/particular images. In other words, the flight attendant panel 80 may be used as a remote control for the controller 4, with only control commands being communicated from the flight attendant panel 80 to the controller 4.

As stated above, the control director 44 and the pixel mapper 46 may be separate entities or may be integrated into a single entity. In the exemplary embodiment of FIG. 2, they are separate entities and are both coupled to the switch 48. In the exemplary embodiment of FIG. 2, the control director 44 has two options for controlling the light units. The first option is the control via providing an image to the pixel mapper 46, as described above. The second option is to control the light units directly. For example, the control director 44 may issue comparably straightforward commands, such as "all light units on" or "all light units off", directly to the local area controller 6 via the switch 48. In this case, no action by the pixel mapper 46 is interposed. It is also possible that such comparably straightforward commands may be carried out via the pixel mapping described above. For example, in order to turn on all light units, the control director 44 may transmit a fully white image to the pixel mapper 46. The pixel mapper 46 may then issue the according operating commands to the light modules.

It is also possible that the pixel mapper 46 is dispensed with and that one or more illumination command sets are stored in the memory 70, which are the result of a pre-mapping of one or more images to the set spatial distribution of the plurality of light modules. In particular, it is possible that one or more images are mapped to the set spatial distribution of the plurality of light modules outside of the aircraft, such as in a factory or design department environment, and that the resulting illumination command sets are uploaded onto the memory 70. In operation, the control director 44 may retrieve those illumination command sets from the memory 70 and issue them to the local area controllers 6.

It is possible that the light modules transmit information back to the controller 4. For example, some or all of the light modules may be configured to transmit information, such as health status, operating hours, etc., to the controller 4. The light modules may provide that information out of their own motion or may provide that information upon request from the controller 4. The information may be conveyed via the predefined operating command protocol as well.

Figure 3:
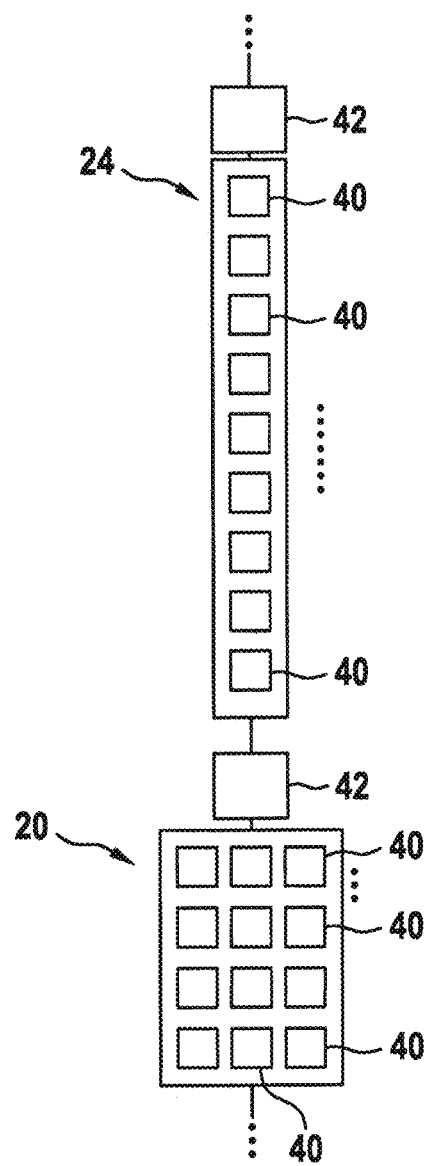
FIG. 3 shows a block diagram of exemplary light units, as may be employed in an aircraft cabin illumination system in accordance with an exemplary embodiment of the invention.

FIG. 3 shows a portion of a daisy chain configuration of light units, as may be coupled to a local area controller of an aircraft cabin illumination system in accordance with an exemplary embodiment of the invention. The depicted portion of FIG. 3 shows a ceiling light unit 20 and a handrail light unit 24, coupled to the same local area controller. Each of the ceiling light unit 20 and the handrail light unit 24 comprises a plurality of light modules 40 and an interface and driver circuit 42.

The ceiling light unit 20 has a plurality of light modules 40, arranged in a two-dimensional array. The handrail light unit 24 has a plurality of light modules 40, arranged in a linear configuration. In the exemplary embodiment of FIG. 3, each of the light modules 40 is a dimmable, multi-color light module. Accordingly, both the light color and the light intensity of each of the light modules 40 can be set individually.

In operation, the interface and driver circuits 42 receive the operating commands for all light modules of the particular daisy chain configuration from the associated local area controller. The interface and driver circuits 42 filter out those operating commands that address the light modules of the light unit in question. They further drive the light modules 40 of the light unit in question in accordance with the received operating commands.

When contemplating FIGS. 2 and 3, it can be seen that the aircraft cabin illumination system 2 has a four-layer architecture. The controller 4 is the first layer, in operation generating the illumination command set, including an operating command for each of the plurality of light modules. The local area controllers 6 are the second layer, in operation passing on those operating commands that are relevant to the downstream light units and supplying power and operating commands to them. The light units are the third layer, providing interface and driver functionality for their light modules. The light modules are fourth layer, in operation providing the desired light output per light module. It has been found that the described four-layer architecture provides a beneficial tradeoff between system complexity, communication bandwidth requirements, wiring efforts, operating speed, and flexibility. However, it is pointed that configurations with more or less layers or pure star networks are possible as well.

FIG. 4 illustrates the mapping of an image to the set spatial distribution of the plurality of light modules of an aircraft cabin illumination system, as may be carried out in a method of operating an aircraft cabin illumination system in accordance with exemplary embodiments of the invention.

Figure 4A:
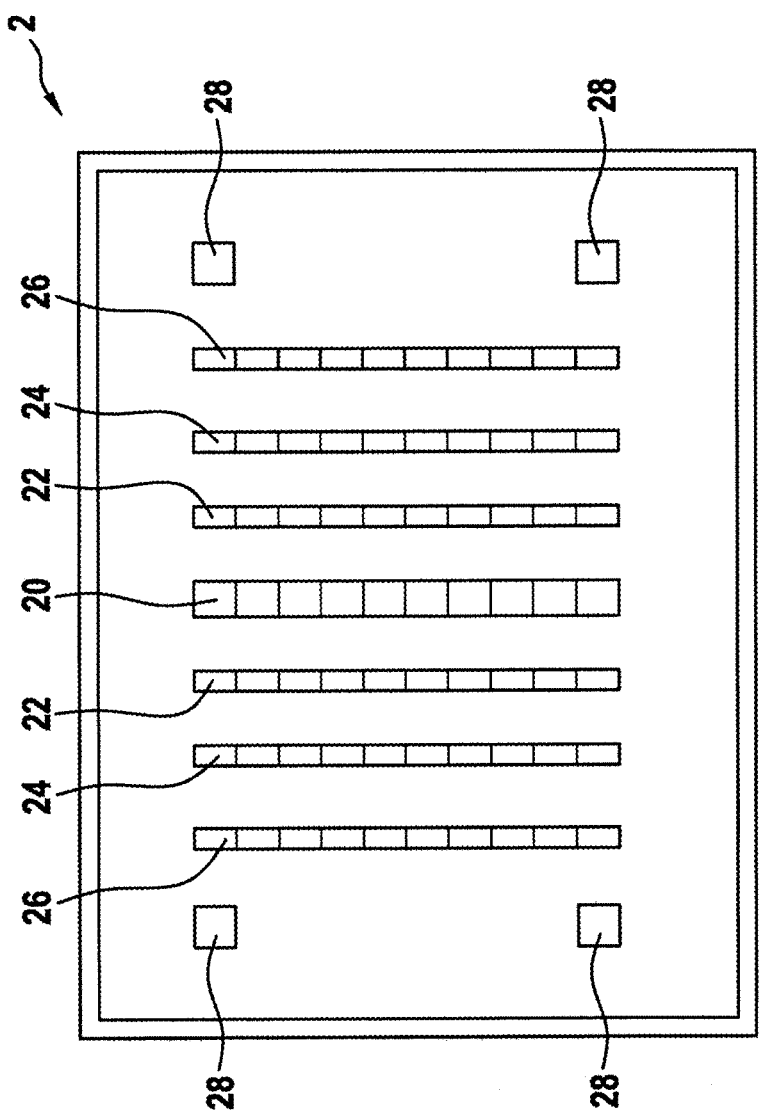
FIGS. 4A-4C illustrate a mapping of an image to the spatial distribution of the light modules of an aircraft cabin illumination system, as may be employed in a method of operating an aircraft cabin illumination system in accordance with an exemplary embodiment of the invention.

FIG. 4A depicts the aircraft cabin illumination system 2 in a twodimensional projection. For ease of illustration, only a portion of the aircraft cabin illumination system 2 of FIG. 1 is depicted. Respective sections of the ceiling light unit 20, the overhead compartment light units 22, the handrail light units 24, the seating light units 26, and selected ones of the wall light units 28 are depicted in FIG. 4. As laid out above, this two-dimensional representation of the aircraft cabin illumination system 2 may also be referred to as a mapping image. It represents a mapping function for mapping pixels of the received image to locations of light modules. Within the depicted ceiling light unit 20, overhead compartment light units 22, handrail light units 24, and seating light units 26, the individual light modules are illustrated as separate sections in FIG. 4A.

Figure 4B:
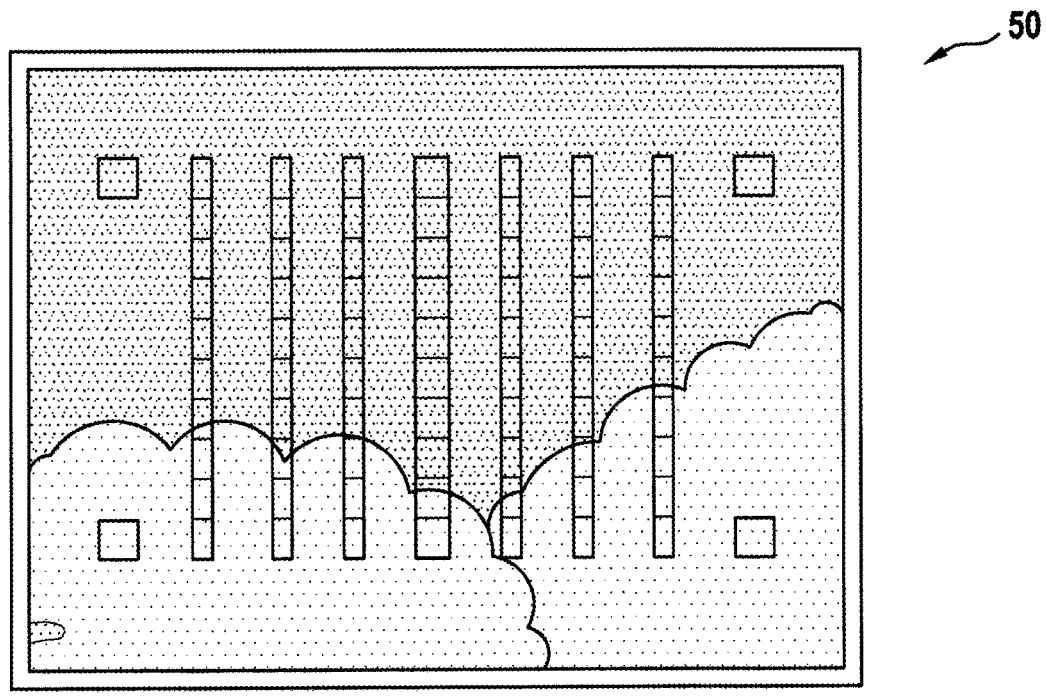

FIG. 4B shows a portion of an image 50, as received by the controller 4. The image 50 forms an input to above described method of operating the aircraft cabin illumination system 2. In the exemplary embodiment of FIG. 4, the image 50 is a cloudy sky, having white clouds in front of a blue background. The white clouds are represented by sparsely dotted regions, and the blue background is represented by densely dotted regions in FIG. 4B.

In operation, the image 50 is mapped to the set spatial distribution of the light modules across the aircraft cabin. As part thereof, the section of the image 50, depicted in FIG. 4B, is mapped to the portion of the aircraft cabin illumination system 2, depicted as a projected representation in FIG. 4A. For illustrative purposes, the light units of FIG. 4A are shown without reference numerals as an overlay over the image 50 in FIG. 4B.

Figure 4C:
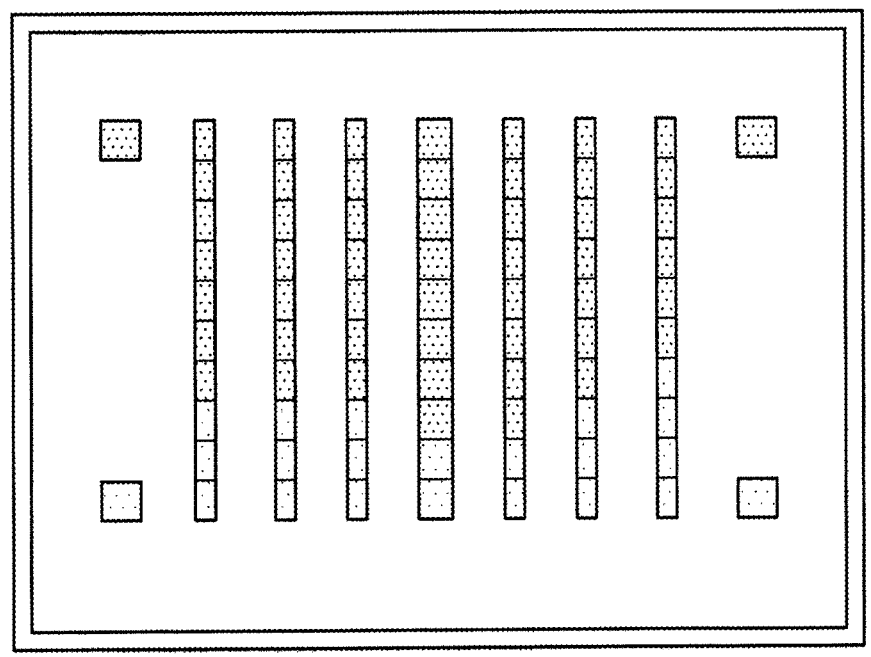

FIG. 4C illustrates the result of the mapping of the image 50 to the set spatial distribution of the plurality of light modules. The respective portions of white and blue are mapped to the locations of the light units and their light modules. The controller generates operating commands for the light modules, each of the operating commands indicating whether the light module in question is to produce a blue light output or a white light output. The entirety of these operating commands, referred to as illumination command set herein, is illustrated in the form of the resulting illumination across a two-dimensional array in FIG. 4C. The resulting illumination of the light modules is illustrated in the form of sparsely dotted regions for a white light output of the light module in question and in the form of densely dotted regions for a blue light output of the light module in question.

As stated above, it is possible that a sequence of images, e.g. in the form of a video, is accessed in the memory 70. In this case, the images may be provided in succession to the pixel mapper 46, the pixel mapper 46 may issue a sequence of illumination command sets, and the illumination of the aircraft cabin may be timevariant in accordance with the sequence of images. In particular, the illumination of the aircraft cabin may resemble the subsequent frames of a video. The time-variant illumination of the aircraft cabin may be synchronized with the output of the video on the screen 60 described above. In the example of the cloudy sky of FIG. 4, the video may contain clouds travelling though the sky and the illumination of the aircraft cabin may resemble the clouds travelling through the sky.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A method of operating an aircraft cabin illumination system having a plurality of light modules with a set spatial distribution of locations across an aircraft cabin, the method comprising:

receiving an image;

mapping the image to the set spatial distribution of the plurality of light modules, wherein said mapping comprises mapping the image to a two-dimensional projection of the locations of the plurality of light modules in the aircraft cabin;

generating an illumination command set, including an operating command for each of the plurality of light modules, on the basis of the mapping of the image to the set spatial distribution of the plurality of light modules; and issuing the illumination command set to the plurality of light modules;

wherein the plurality of light modules (40) are distributed among at least two of the group comprising:
at least one ceiling light unit (20),
at least one overhead compartment light unit (22),
at least one handrail light unit (24),
at least one seating light unit (26),
at least one wall light unit (28),
at least one window light unit (30), and
at least one monument light unit (32).

2. The method according to claim 1, wherein, for at least a subset of the plurality of light modules, the operating command is indicative of at least one of a light color and a light intensity.

3. The method according to claim 1, wherein the step of receiving the image comprises:
receiving the image from outside of the aircraft cabin illumination system, in particular receiving the image from a flight attendant panel coupled to the aircraft cabin illumination system, or
receiving the image from a memory within the aircraft cabin illumination system, in particular receiving the image from the memory in response to receiving an image selection command from outside of the aircraft cabin illumination system and accessing the memory in accordance with the image selection command.

4. The method according to claim 1, further comprising:
receiving a sequence of images;
mapping each of the sequence of images to the set spatial distribution of the plurality of light modules;
generating a sequence of illumination command sets, each of the plurality of illumination command sets including an operating command for each of the plurality of light modules, on the basis of the mapping of each of the sequence of images to the set spatial distribution of the plurality of light modules; and
issuing the sequence of illumination command sets to the plurality of light modules.

5. The method according to claim 1, further comprising:
displaying the image on a screen in the aircraft cabin, in particular on a common screen arranged in a front portion of the aircraft cabin.

6. A method of generating an illumination command set for a plurality of light modules of an aircraft cabin illumination system, the plurality of light modules having a set spatial distribution of locations across an aircraft cabin, the method comprising:
mapping an image to the set spatial distribution of the plurality of light modules, wherein said mapping comprises mapping the image to a two-dimensional projection of the locations of the plurality of light modules in the aircraft cabin; and
generating the illumination command set, including an operating command for each of the plurality of light modules, on the basis of the mapping of the image to the set spatial distribution of the plurality of light modules;

wherein the plurality of light modules are distributed among at least two of the group comprising:
at least one ceiling light unit,
at least one overhead compartment light unit,
at least one handrail light unit,
at least one seating light unit,
at least one wall light unit,
at least one window light unit, and
at least one monument light unit.

7. An aircraft cabin illumination system, comprising:
a plurality of light modules having a set spatial distribution of locations across an aircraft cabin; and
a controller for controlling the plurality of light modules, wherein the controller is configured to:
receive an image;
map the image to the set spatial distribution of the plurality of light modules, wherein the controller is configured to map the image to a two-dimensional projection of the locations of the plurality of light modules in the aircraft cabin;
generate an illumination command set, including an operating command for each of the plurality of light modules, on the basis of the mapping of the image to the set spatial distribution of the plurality of light modules; and
issue the illumination command set to the plurality of light modules-;
wherein the plurality of light modules are distributed among at least two of the group comprising:
at least one ceiling light unit,
at least one overhead compartment light unit,
at least one handrail light unit,
at least one seating light unit,
at least one wall light unit;
at least one window light unit, and
at least one monument light unit.

8. The aircraft cabin illumination system according to claim 7, wherein at least a first subset of the plurality of light modules are multi-color light modules and wherein the controller is configured to generate operating commands for at least the first subset of the plurality of light modules that include light color indications.

9. The aircraft cabin illumination system according to claim 7, wherein at least a second subset of the plurality of light modules are dimmable light modules and wherein the controller is configured to generate operating commands for at least the second subset of the plurality of light modules that include light intensity indications.

10. The aircraft cabin illumination system according to claim comprising a plurality of light units, wherein each of the plurality of light units includes one or more of the plurality of light modules.

11. The aircraft cabin illumination system according to claim 10, wherein each of the plurality of light units includes one light module or a linear arrangement of multiple light modules or a two-dimensional array of multiple light modules.

12. The aircraft cabin illumination system according to claim 10, wherein the controller is a global controller, wherein the aircraft cabin illumination system comprises a plurality of local area controllers coupled to the global controller, and wherein the plurality of light units are coupled to the local area controllers.

* * * * *